United States Patent
Goldberg

(10) Patent No.: US 7,174,273 B2
(45) Date of Patent: Feb. 6, 2007

(54) FILTER MONITORING SYSTEM

(75) Inventor: Gary Goldberg, San Diego, CA (US)

(73) Assignee: Hamilton Sundstrand Corporation, Rockford, IL (US)

( * ) Notice: Subject to any disclaimer, the term of this patent is extended or adjusted under 35 U.S.C. 154(b) by 0 days.

(21) Appl. No.: 11/126,631

(22) Filed: May 11, 2005

(65) Prior Publication Data

US 2006/0259273 A1 Nov. 16, 2006

(51) Int. Cl.
*G06F 11/30* (2006.01)
*G06F 11/00* (2006.01)
(52) U.S. Cl. .............. 702/182; 702/185; 702/187; 702/188
(58) Field of Classification Search ............. 702/182, 702/183, 184, 185, 186, 187, 188–190, 47, 702/50, 98; 210/739, 741, 745; 73/53.05, 73/53.07; 60/453
See application file for complete search history.

(56) References Cited

U.S. PATENT DOCUMENTS

| | | | |
|---|---|---|---|
| 4,485,011 A | 11/1984 | Cole et al. | |
| 4,944,876 A | 7/1990 | Miller | |
| 5,132,009 A | 7/1992 | Futa, Jr. et al. | |
| 5,200,064 A | 4/1993 | Russ et al. | |
| 5,461,368 A * | 10/1995 | Comer | 340/607 |
| 5,968,371 A * | 10/1999 | Verdegan et al. | 210/739 |
| 6,357,219 B1 | 3/2002 | Dudd, Jr. et al. | |
| 6,736,980 B2 * | 5/2004 | Moscaritolo | 210/741 |

* cited by examiner

*Primary Examiner*—Bryan Bui
(74) *Attorney, Agent, or Firm*—Carlson, Gaskey & Olds

(57) ABSTRACT

A filter monitoring system employs a differential pressure sensor to provide a continuous signal output proportional to a pressure drop across a filter element. The differential pressure sensor communicates with a controller that provides output signals to indicate that the filter requires replacement and provides advanced warning for when the filter element will reach a predicted filter differential pressure limit value.

12 Claims, 3 Drawing Sheets

FILTER MONITORING SYSTEM

BACKGROUND OF THE INVENTION

The present invention relates to a liquid filtration system, and more particularly to a filtration monitor system for an open loop fluid system.

While most aircraft fuels are subject to stringent quality standards, storage and refueling equipment may contaminate the high quality fuel with contaminants. This contamination may still occur even though efficient filtration and water separating equipment is utilized whenever fuel is transferred from one point to another. Considering the potential variability of fuel supplies, aircraft typically include an internal fuel filter system to further assure that only acceptable fuel is supplied to the aircraft engines.

Fluid filter systems typically become contaminated and clogged over time. In most cases the filters are replaced on a periodic basis as part of routine maintenance. In some filter systems, a differential pressure-sensing device provides a mechanical or electrical indication the filter is clogged and a bypass valve around the filter was tripped to allow continued operation with the clogged filter. This practice results in operation without filtration of the fluid, creating the possibility of component contamination.

In closed fluid systems, which operate on a fixed supply of fluid with limited fluid additions (such as gearbox lubrication systems), the rate of debris accumulation may be minimal and the filter element will last the life of the equipment barring an extraordinary event. In open systems with a continuous through flow (such as fuel delivery systems), the rate of contamination buildup is directly dependent on the quality of the fuel supply.

Although filter elements are replaced on a routine basis, the replacement interval is typically conservatively specified, due to varying operating conditions which may result in unnecessary maintenance and an unneeded expense. In particular, aircraft are rotated through a maintenance cycle on a predetermined scheduled interval. As the scheduled interval does not typically correlate with a filter contamination rate (due to fuel contaminant variability), the filter elements are often replaced as a matter of routine to always assure a proper functioning filter. This may further increase the scheduled maintenance expense.

Conventional filter monitoring systems often utilize a mechanical differential pressure monitor with a thermal lockout that prevents the device from actuating due to the increased viscosity of a cold fluid. This type of monitoring system triggers an electrical switch and/or a visual indicator when a predetermined ΔP reaches a trigger level. The trigger level is typically set around 80% of the level that would result in filter bypass or clogging as the equipment needs to be operable for a specified period of time following the trigger to conveniently schedule required maintenance.

Disadvantageously, such conventional monitoring systems are mechanical and may fail due to vibration and pressure oscillations; the interval between trigger indication and eventual clogging or bypass varies with the level of new contaminant introduction; and extraordinary contamination events are undetected until the trigger level is reached.

Accordingly, it is desirable to provide a filter system that monitors the filter element to determine when the filter element is expected to reach a particular clogged level to more closely correlate filter replacement with a maintenance schedule to minimize expense and increase resource efficiency.

SUMMARY OF THE INVENTION

A filter monitoring system according to the present invention employs a differential pressure sensor to provide a continuous signal output proportional to a pressure drop across a filter element. This differential pressure sensor communicates with a controller that monitors the differential pressure signal and performs calculations based on prior stored predicted differential pressure data and set instructions. The controller then provides output signals to indicate that the filter element requires replacement. The controller also receives a user-specified interval to provide advance warning which indicates when the filter element will reach a predicted filter differential pressure limit value.

The present invention therefore provides a filter system which monitors the filter element to determine when the filter element is expected to reach a particular clogged level to more closely correlate filter replacement with a maintenance schedule to minimize expense and increase resource efficiency.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
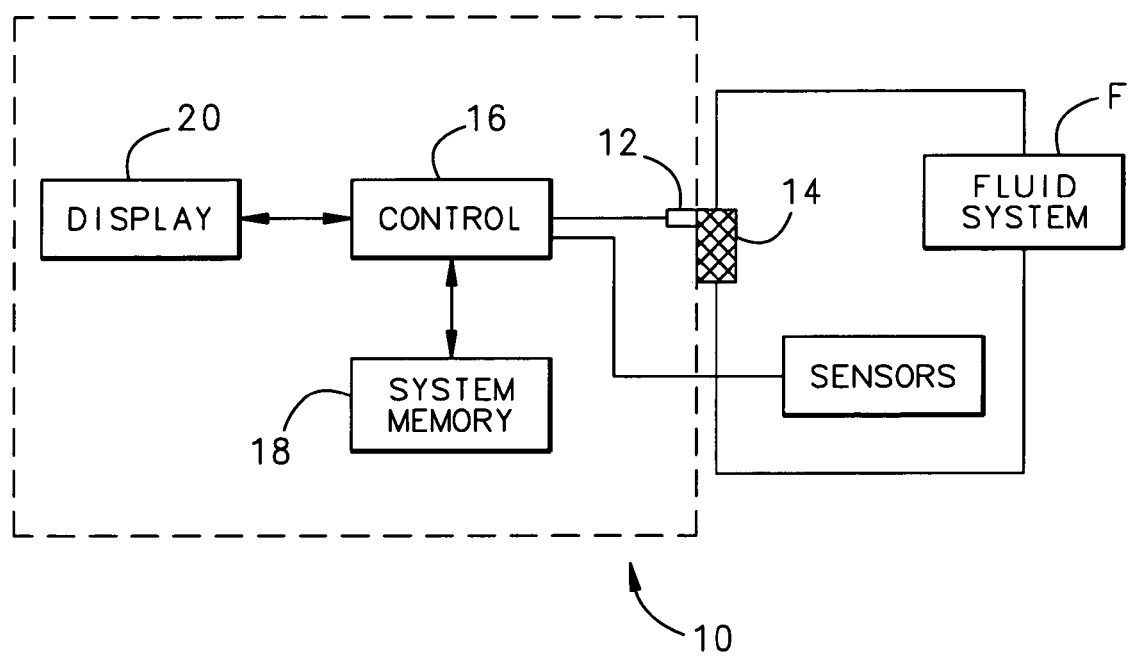
FIG. 1 is a general schematic view of a filter monitor system.
Figure 3:
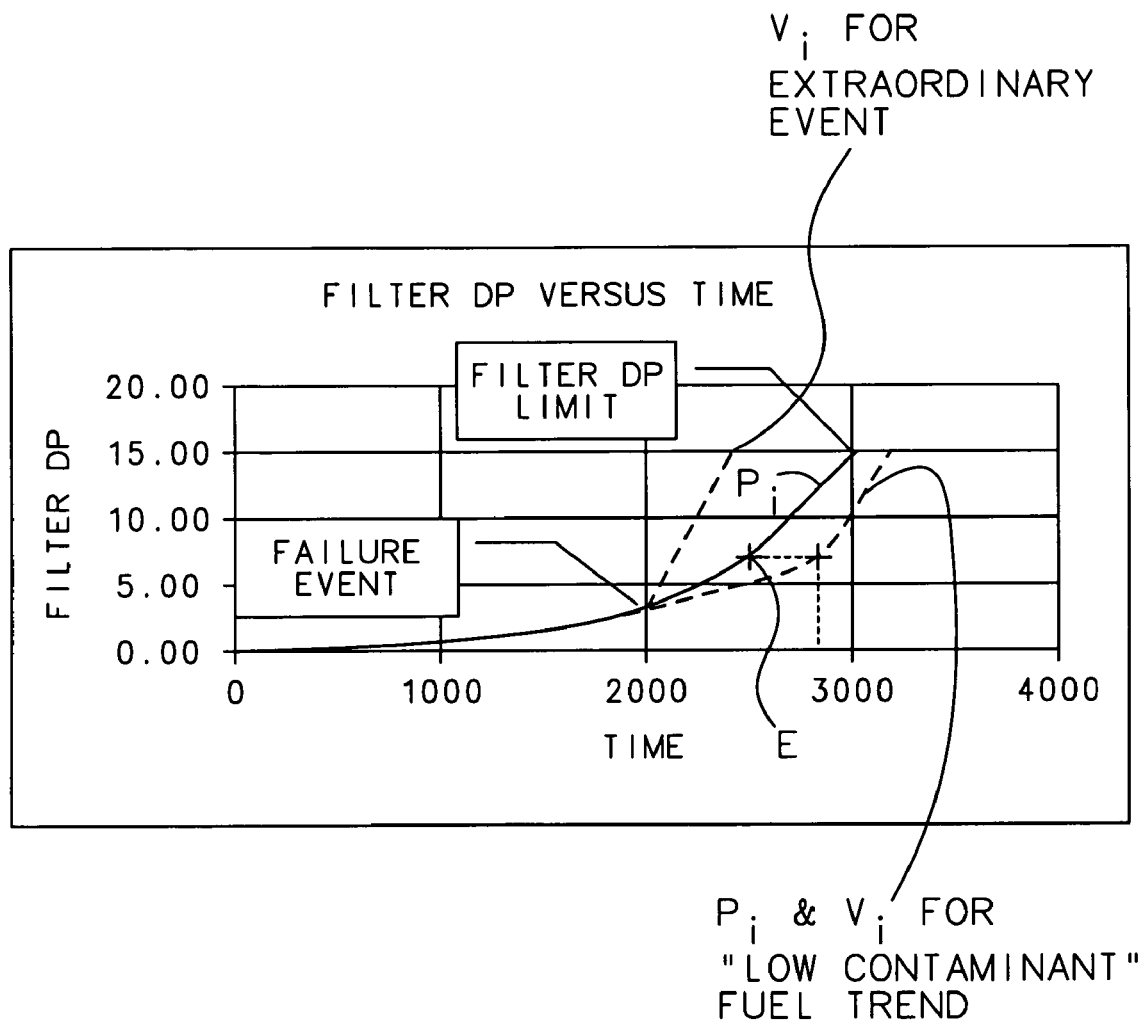
FIG. 3 is a graphical representation of a predicted differential pressure determination according to the present invention.

FIG. 1 illustrates a general schematic view of a filter monitor system 10. A differential pressure sensor 12 monitors a filter element 14 to provide a continuous differential pressure signal output proportional to a pressure drop across the filter element 14. It should be understood that the filter element may be located within any open or closed loop system but a preferred use is an aircraft fuel system (illustrated schematically at F). The differential pressure sensor 12 communicates with a controller 16 that monitors the sensor signal and performs calculations based on stored data and instruction sets. That is, the controller 16 includes a system memory 18 that retains various sensed information that is sampled at predetermined time periods. Preferably, differential pressure data, fluid temperature as well as historical information from previous filter elements used in the system are sampled to determine a predicted filter element performance $P_i$ (FIG. 3) within the system memory 18.

Preferably, additional trend predication data sets are maintained with the system memory 18. Input from additional sensors that indicate the fluid temperature, parameters related to flow rate, as well as other parameters to normalize the data or select the time to record the data sample such that it will be consistent with the prior data may additionally be provided. The system 10 preferably uses data taken with a low fluid temperature to more accurately predict the level of contamination filtered. Since fluid viscosity is proportional to fluid temperature small ΔP readings would be amplified if taken with cold fluid. It should be understood that various temperature compensation schemes may alternatively or additionally be utilized The controller 16 generates output signals on a display 20 to indicate information regarding the state of the filter element 14. The equipment operator can monitor the display 20 to determine the remaining estimated life of the filter and whether the filter requires replacement. It should be understood that various user and maintenance specific displays 20 may be utilized with the present invention.

The controller 16 preferably provides for a user-specified interval between an indication of maintenance indication and a predicted filter-clogging time. This interval may be calculated individually for each piece of equipment based on a prior history of contamination buildup stored within the system memory 18. For example only, should a user desire 500 hours of notice prior to a particular filter clogging level as represented by a differential pressure, the system 10 will provide an alert 500 hours prior to when the filter element is expected to reach the particular filter clogging level.

Figure 2:
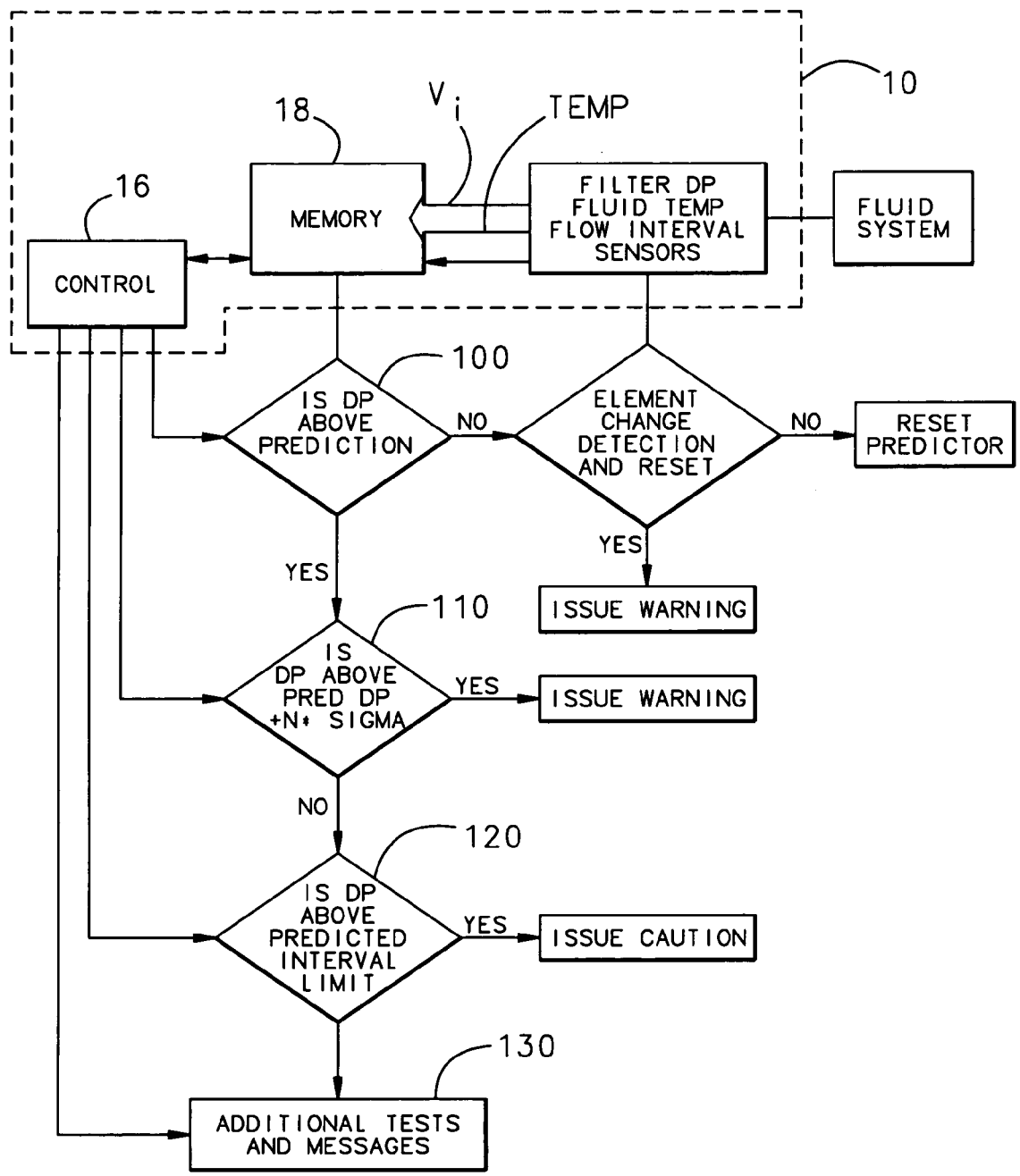
FIG. 2 is a flow chart of the operation of the filter monitoring system.

Referring to FIG. 2, a flow chart illustrates a general flow diagram for operation of the filter monitor system 10. A filter differential pressure measurement $V_i$ and a fluid temperature measurement (Temp) from sensors in communication with the filter element 14 are communicated to the controller 16 for storage in the system memory 18 of the system 10 at a predetermined time period $t_i$ such that the predicted filter element performance $P_i$ may be generated (as graphically represented in FIG. 3). It should be understood that various performance analysis based on testing and the like provide an initial performance prediction for the filter element 14, which may then be modified based on the measured performance over prior occurrences. In other words, actual measured data is utilized to modify predicted differential pressure at particular time intervals.

The system 10 will first check to determine whether the filter element has been changed from the last time interval in step 100. That is, the filter differential pressure signal $V_i$ should be increasing over the life of the filter element 14. If the filter differential pressure signal $V_i$ is below a predicated differential pressure by a predetermined amount, the system 10 will identify that the filter element has been replaced and reset the time interval $t_i$ equal to zero. The prior data is retained for analysis or subsequent predictions within the system memory 18.

If the filter differential pressure signal $V_i$ is above the predicated differential pressure $P_i$ for that time interval $t_i$, the system 10 will progress to step 110. Preferably, the system 10 will issue a higher level warning when:

$$V_i > P_{i+n\sigma}.$$

Where: $V_i$ is the filter $\Delta P$ reading at a given time $t_i$; and $P_i$ is a predicted $\Delta P$ value based on a mathematical calculation based on prior occurrences of $V_{i-n}$. This prediction is preferably a mathematically based regression analysis and curve fitting technique that best matches the typical filter element $\Delta P$ to contamination characteristic (as representatively illustrated by the graph of $V_i$ in FIG. 3).

When $V_i > P_{i+n\sigma}$, the rate of filter $\Delta P$ increase has exceeded n times the prior standard deviation and that a significant debris generating event (dashed line in FIG. 3) may have occurred and failure is imminent. This provides an immediate alert when an extraordinary event occurs such as an aircraft receiving highly contaminated fuel during refueling as indicated by the radical change in slope of the dashed line in FIG. 3 at the 2000 hour mark which deviates from the predicted trend of the solid line.

So long as $V_i < P_{i+n\sigma}$, the system 10 will continue to monitory differential pressure and display a warning message that the filter element 14 will require replacement by a user-specified time interval at step 120 if:

$$V_i > P_{i+E},$$

Where:

E is a user-specified interval for the system 10 to provide a filter element replacement before a differential pressure limit value. That is, the filter element 14 will become clogged after the specified interval E based on a prediction of the rate of filter clogging determined to date. For example only, if the filter element differential pressure limit value is 15.0 and E is set at 500 hours, the system 10 will issue a replace filter element caution when $V_i$ reaches 7 as illustrated by the predicted filter element performance $P_i$ in FIG. 3. In other words, when the system 10 determines that the measured differential pressure $V_i$ of the filter element is 7 the system 10 will provide the user-specified 500 hours of warning after which the filter element will have a predicted differential pressure $P_i$ at the differential pressure limit value of 15. Notably, if the fluid received is consistently of high quality with low contaminant the filter element will last for an extended period of time and the system 10 will effectively shift the predicted differential pressure trend curve $P_i$ (illustrated in an exaggerated format for sake of clarity) as measurements of actual differential pressure measurements $V_i$ which begin to illustrate the "low contaminant" fuel trend beginning as exemplarily illustrated in FIG. 3 at the 2000 hour mark. In this situation, the replace filter alert will occur at approximately 2800 hours as the filter element is now predicted to last to approximately 3300 hours due to the "low contaminant" fuel.

In step 130, the system 10 may additionally record the number of occurrences of filter bypass to provide information as to the applicability of warranty coverage due to component contamination and may utilize the pressure sensors to provide additional warnings of low or high system pressure.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A filter monitoring system comprising:
a differential pressure sensor for monitoring a filter element;
a controller in communication with said differential pressure sensor to determine a filter element performance at a multitude of time intervals in response to signals from said differential pressure sensor and determine a predicted filter element performance;
a system memory in communication with said controller to store said filter element performance at said multitude of time intervals and said predicted filter element performance, said controller operable to compare said filter element performance with said predicted filter element performance; and
a display in communication with said controller, said display generating a warning when said controller determines that $V_i > P_{i+E}$, where $V_i$ is the filter $\Delta P$ reading at a given time $t_i$; $P_i$ is a predicted value based on a mathematical calculation based on prior occurrences of $V_{i-m}$, E is a user-specified interval.

2. The filter monitoring system as recited in claim 1, further comprising a temperature sensor in communication with said controller.

3. The filter monitoring system as recited in claim 2, wherein said controller correlates said time intervals with a predetermined temperature.

4. The filter monitoring system as recited in claim 1, wherein said display generates a warning when said controller determines that $V_i > P_{i+n\sigma}$, where: $V_i$ is the filter $\Delta P$ reading at a given time $t_i$; $P_i$ is a predicted value based on a mathematical calculation based on prior occurrences of $V_{i-m}$; and $n\sigma$ is a multiple of a predetermined standard deviation.

5. A method of monitoring a filter element comprising the steps of:
(1) measuring a differential pressure of a filter element at a time interval;
(2) comparing the measured differential pressure with a predicted differential pressure for the time interval;
(3) issuing a warning when the comparison of said step (2) indicates the measured differential pressure deviates from the predicted differential by a predetermined amount; and
(4) resetting a time interval to zero to indicate a filter replacement.

6. A method as recited in claim 5, wherein said step (3) further comprises:

(a) determining that $V_i > P_{i+n\sigma}$, where: $V_i$ is the filter $\Delta P$ reading at the predetermined time interval $t_i$; and $P_i$ is the predicted differential pressure value; and $n\sigma$ is a multiple of a predetermined standard deviation.

7. A method as recited in claim 6, wherein said step (a) further comprises: determining the predicted differential pressure based on prior occurrences of $V_{i-m}$.

8. A method as recited in claim 5, wherein said step (3) further comprises:
(a) determining that $V_i > P_{i+E}$, where: $V_i$ is the filter $\Delta P$ reading at the predetermined time interval $t_i$; $P_i$ is the predicted differential pressure value; and E is a user-specified interval.

9. A method as recited in claim 5, wherein said step (3) further comprises:
(a) determining that the measured differential pressure is below the predicted differential by a predetermined amount.

10. A method of monitoring a filter element comprising the steps of:
(1) setting a user-specified time interval to declare an advanced warning for a filter element replacement, the filter element replacement occurring when the filter element will have a differential pressure of a predetermined differential pressure limit value;
(2) measuring a differential pressure of a filter element at a multitude of time intervals;
(3) comparing the measured differential pressure at each of the multitude of time intervals with a predicted advanced warning differential pressure which represents the predetermined differential pressure limit value less the user specified time interval; and
(4) issuing a warning when the comparison of said step (3) indicates that the measured differential pressure approximates the predicted advanced warning differential pressure.

11. A method as recited in claim 10, wherein said step (2) further comprises:
(a) measuring the differential pressure at a predetermined fluid temperature.

12. A method as recited in claim 10, further comprising the step of (5) determining a predicted differential pressure for a multitude of time intervals up to the predetermined differential pressure limit value from the differential pressure measured in said step (2).

* * * * *